United States Patent
Elferink et al.

[11] Patent Number: 6,016,738
[45] Date of Patent: Jan. 25, 2000

[54] PISTON COMPRESSOR OF THE HORIZONTAL TYPE

[75] Inventors: Johannes Jacobus Elferink, Westervoort; Laurentius G.M. Koop, Rheden; Renatus J.M. Schutte, Zutphen, all of Netherlands

[73] Assignee: Thomassen International B.V., Rheden, Netherlands

[21] Appl. No.: 08/836,172

[22] PCT Filed: Nov. 7, 1995

[86] PCT No.: PCT/NL95/00379

§ 371 Date: Aug. 27, 1997

§ 102(e) Date: Aug. 27, 1997

[87] PCT Pub. No.: WO96/15369

PCT Pub. Date: May 23, 1996

[30] Foreign Application Priority Data

Nov. 10, 1994 [NL] Netherlands ............................ 9401878

[51] Int. Cl.[7] .............................. F04B 39/00; F01B 31/00
[52] U.S. Cl. ............................ 92/127; 92/158; 92/165 R; 92/DIG. 2
[58] Field of Search ............................ 92/127, 153, 156, 92/157, 158, 159, 160, 165 R, 166, DIG. 2

[56] References Cited

U.S. PATENT DOCUMENTS

| | | | |
|---|---|---|---|
| 198,391 | 12/1877 | Jamieson | 92/159 X |
| 288,037 | 11/1883 | Donnenwerth | 92/159 X |
| 316,492 | 4/1885 | Simpson et al. | 92/159 X |
| 764,886 | 7/1904 | Donnenwerth | 92/159 X |
| 818,860 | 4/1906 | Bates | 92/127 |
| 1,064,542 | 6/1913 | Rittersbach | 92/127 |
| 1,545,936 | 7/1925 | Black | 92/159 X |
| 1,604,594 | 10/1926 | Nelson | 92/127 |
| 1,912,292 | 5/1933 | M'Gillycuddy | 92/127 X |
| 2,748,718 | 6/1956 | MacClatchie | 92/160 X |
| 3,137,439 | 6/1964 | Hanny et al. | |
| 5,052,278 | 10/1991 | Smillie, III et al. | 92/159 |

FOREIGN PATENT DOCUMENTS

| | | |
|---|---|---|
| 0 156 462 | 10/1985 | European Pat. Off. . |
| 2 627 236 | 8/1989 | European Pat. Off. . |
| 0 434 607 | 6/1991 | European Pat. Off. . |
| 12 06 667 | 12/1965 | Germany . |
| 359 507 | 2/1962 | Switzerland . |

*Primary Examiner*—John E. Ryznic
*Attorney, Agent, or Firm*—Michael D. Bednarek; Crowell & Moring LLP

[57] ABSTRACT

Piston compressor for compressing gas, comprising a frame with at least one cylinder which has an essentially horizontal axis, a piston which is reciprocable in the cylinder, a piston rod which at one end thereof is fixed to the piston, while the other end thereof is coupled to a crosshead which is guided in the frame and is reciprocable by a drive mechanism, and bearing means which support the piston/piston rod unit, formed by the piston and the piston rod connected thereto, relative to the frame. The bearing means comprise:

a source which continuously delivers a gas under pressure, conduit means which are connected to the source and open out at at least one outflow opening for supplying the gas coming from the source to a position between the piston and the cylinder, the position of the at least one outflow opening and the pressure of the gas supplied from the source being such that gas supplied to a position between the piston and the cylinder constantly exerts an upward pressure on the piston/piston rod unit.

17 Claims, 6 Drawing Sheets

PISTON COMPRESSOR OF THE HORIZONTAL TYPE

BACKGROUND OF THE INVENTION

The present invention relates to a piston compressor for compressing gas according to the preamble of claim 1.

Such a horizontal piston compressor is known from, for example, EP-A-0 434 607. Piston compressors of the type mentioned in the preamble are generally very large double-acting compressors with several cylinders and are used in particular in the oil and petrochemicals industry. The forces of inertia which are the result of the large mass of the reciprocating parts of the compressor are a major reason for placing the cylinders horizontally in the frame. Although a large part of these forces can be compensated for by balancing the movements of the piston/piston rod units, the remaining forces on the frame of the compressor can be absorbed more readily by the bedplate of the compressor if they are directed horizontally instead of vertically.

However, the horizontal position of the cylinder(s) in the case of the type of piston compressor described in the preamble leads to the generally known problem with regard to supporting the reciprocating piston/piston rod unit relative to the stationary part of the compressor, i.e. the frame and the cylinder(s) forming part thereof. In the case of the horizontal compressors of this type known hitherto a piston/piston rod unit is supported at the crosshead side by the crosshead which is guided in the frame, and at the other side the piston rests on the bottom part of the wall of the cylinder. In the case of this type of compressor the piston is usually provided with one or more replaceable belts, which lie around the piston in the peripheral direction and project beyond the body of the piston, as described in EP-A-0 434 607. These belts are known as rider rings. Rider rings which do not extend all the way around the piston, but extend only along a bottom segment of the periphery of the piston, are also known.

As described in EP-A-0 434 607, wear of the rider rings leads to run-out, which is permissible only within certain limits. Until now, oil has generally been used as the lubrication between the piston and the cylinder wall in order to prevent excessive wear of the bearing surfaces and the occurrence of run-out. However, in recent years there has been an increasing need for compressors of the "oil-free type", in other words, compressors in which the compressed gas is not polluted by lubricating oil which provides the lubrication between the rider rings around the piston and the cylinder. In order to be able to make a compressor of the type mentioned in the preamble an "oil-free compressor", great attention is paid to the composition of the material of the rider rings and the fastening thereof to the piston. For example, it is known to make the rider rings from materials with advantageous lubricating and wear properties, such as PTFE.

As described earlier, horizontal piston compressors of the type mentioned in the preamble are used mainly in situations where continuous operation is required. The mechanical construction of this type of piston compressor was developed over many decades in such a way that such compressors could operate continuously at high efficiency for years. However, it was found that, despite recent developments, the wear on the rider rings can still be undesirably fast, inter alia, due to parameters which cannot be influenced. This means that in practice the compressors have to be shut down after a few months, in order to measure the wear on the rider rings, and in order to be able to replace any rider rings which may be worn. This maintenance adversely affects the overall efficiency and serviceability of this type of compressor.

OBJECT OF THE INVENTION

The object of the present invention is to propose bearing means which are effective between the piston and the cylinder of the compressor, and which make it possible to provide a piston compressor of the horizontal type which can be in operation continuously for considerably longer periods than the hitherto known compressors of the type mentioned in the preamble. In particular, the object of the invention is to provide a horizontal piston compressor which is double-acting and "oil-free".

SUMMARY OF THE INVENTION

The invention provides a horizontal piston compressor of the type mentioned in the preamble, which is characterized in that the bearing means further comprise:

- a source which continuously delivers a gas under pressure,
- conduit means which are connected to the source and open out at at least one outflow opening provided in the annular element for supplying the gas coming from the source to a position between the annular element and the cylinder, the position of the at least one outflow opening and the pressure of the gas supplied from the source being such that gas supplied to a position between the annular element and the cylinder constantly exerts an upward force on the piston/piston rod unit.

The bearing means proposed according to the invention in fact form an externally pressurised gas bearing system, in which a gas film is formed at one or more places between the one or more annular elements and the cylinder, which gas film at least partially bears the mass of the piston/piston rod unit. What is important here is that the gas film is maintained continuously, in order to limit or if possible completely eliminate wear-producing contact between the piston/piston rod unit and the cylinder. It is also important for the thickness of the gas film, which is very low in practice, to be kept stable, otherwise there is the risk of the piston/piston rod unit beginning to oscillate in the vertical direction and excessive wear still occurring.

For high stability of the gas film it is preferable to provide gas sealing means which are effective between the piston and the cylinder, and which together with the piston and the cylinder bound a space separated from each compression chamber of the piston compressor, in which space the at least one outflow opening opens out, and gas discharge means are provided for discharging the gas from the space.

The bearing means also advantageously comprise gas pressure control means, for controlling the pressure of the gas in the space. Controlling the gas pressure in the sealed space between the piston and the cylinder involves maintaining the gas pressure at a particular value or within a particular permissible range, and can be carried out in any suitable manner. For example, it is possible to provide a control circuit in which the actual gas pressure is compared with a desired gas pressure. The gas pressure is preferably controlled by setting or dimensioning the means provided therefor once, for example providing valves which open or close at a specific value of the gas pressure. It is advantageous to provide the gas pressure control means in the gas discharge means.

It has been found that piston rings are very advantageous for the gas seal in the case of the type of piston compressor of large dimensions involved here, since such rings are capable of providing a reliable gas seal for high pressures in the case of unavoidable manufacturing tolerances and the various thermal and mechanical expansions which occur.

The inventive idea can be used very advantageously for converting existing piston compressors of the "oil-lubricated" type to "oil-free" compressors, or for providing existing "oil-free" compressors with a "gas lubrication".

Advantageous embodiments of the inventive idea are described in the claims and the description which follows.

The invention will be explained in greater detail below with reference to the exemplary embodiments shown in the drawings.

DETAILED DESCRIPTION OF THE DRAWINGS

Figure 1:
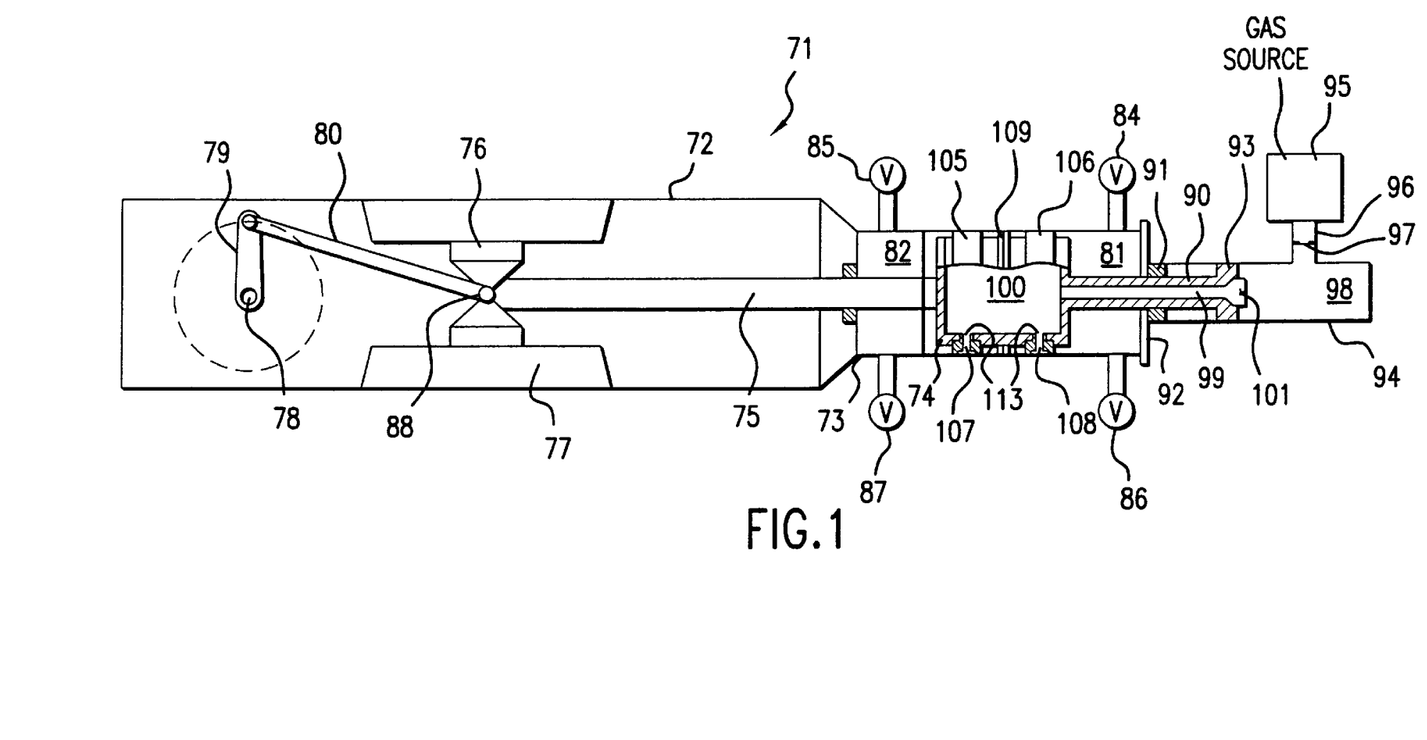
FIG. 1 shows diagrammatically a vertical section of a first exemplary embodiment of the horizontal piston compressor according to the invention.

The horizontal piston compressor 71 shown in FIG. 1 comprises a frame 72, in which a cylinder 73 is accommodated. The cylinder 73 contains a piston 74, which reciprocable in the cylinder 73. In FIG. 1 the bottom part of the piston is shown in section, and the top part in elevation.

A piston rod 75 is fixed to the piston 74 at its right end in FIG. 1, and at its left end in FIG. 1 is connected to crosshead 76. The crosshead 76 is guided reciprocably in a horizontal straight line in the frame 72 of the compressor by means of guides 77.

The movement of the crosshead 76 is produced by means of a crank mechanism, such as is generally known in the case of horizontal piston compressors. The rotary movement of drive shaft 78 is transmitted to the crosshead 76 by way of the crank 79 immovably connected thereto and connecting rod 80, which is fitted between the crank 79 and the crosshead 76.

The compressor shown in FIG. 1 is of the double-acting type. Compression chambers 81 and 82 are formed in the cylinder 73 by the piston 74. Each of the compression chambers 81,82 is provided with an inlet valve 84,85 and an outlet valve 86,87, respectively. On movement of the piston 74 in the direction of the crank mechanism, to the left in FIG. 1, gas at a suction pressure is sucked by way of the inlet valve 84 into the compression chamber 81. At the same time the gas present in the compression chamber 82 is compressed and discharged at a discharge pressure by way of the outlet valve 87.

As the name horizontal piston compressor already indicates, the frame 72 of the compressor is placed on a bedplate in such a way that the cylinder 73 is situated in a horizontal position. According to the present invention, measures are proposed for the bearing support of the piston/piston rod unit, formed by the piston 74 and the piston rod 75. At the left end in FIG. 1 said unit rests by way of the crosshead 76 on the frame 72, lubricating oil generally being introduced between the guides 77 and the crosshead 76. However, this support at the crosshead 76 is unable to prevent the piston 74 from dragging along the bottom part of the wall of the cylinder 73, in particular because there will be a certain play between crosshead 76 and guides 77, which permits tilting of the crosshead 76, and because the slim piston rod 75 will bend. The other bearing means which support the piston/piston rod unit are described below.

In the case of the exemplary embodiment shown in FIG. 1 the piston 74 is provided with a rod 90, which extends in line with the piston rod 75 at the other side of the piston 74. The rod 90 projects through stuffing box 91 in cylinder cover 92 of the cylinder 73. The free end of the rod 90 bears a piston part 93, which is situated in a second cylinder 94 fitted on the cylinder cover 92. Reference number 95 indicates diagrammatically a source for gas. Said source 95, which can be formed by, for example, a chamber connected to the delivery valves 86 and 87 of the compressor, is in communication with compression chamber 98 in the cylinder 94 by way of conduit 96, which has a suction valve 97 accommodated therein. The rod 90 has a bore 99, which extends from the end face of the piston part 93 to chamber 100, which is formed in the piston 74. The communication between the bore 99 and the compression chamber 98 is controlled by a delivery valve 101, which is accommodated in the piston part 93 and opens if sufficiently high pressure is reached in the compression chamber 98. During the reciprocating movement of the piston/piston rod unit this ensures that gas under pressure is constantly present in the chamber 100.

Figure 2:
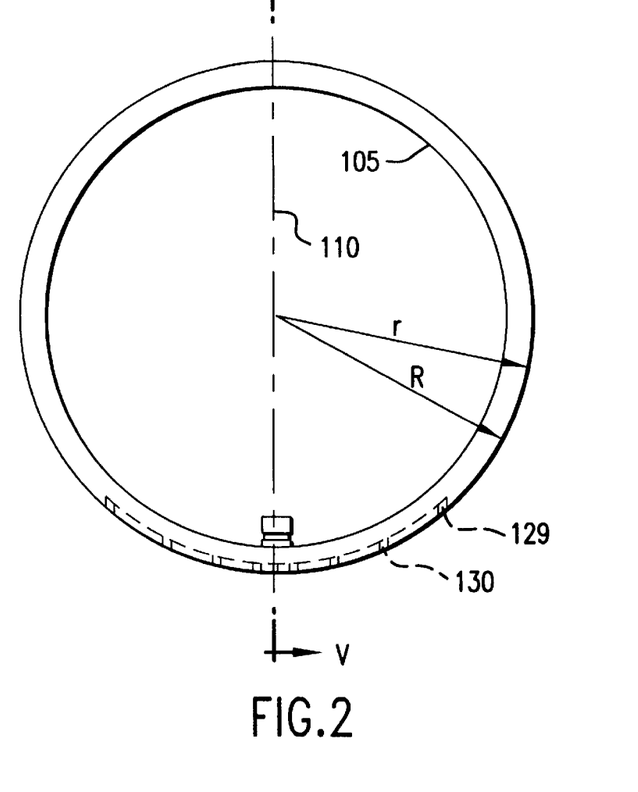
FIG. 2 shows in side view an exemplary embodiment of a rider ring of the compressor in FIG. 1.
Figure 3:
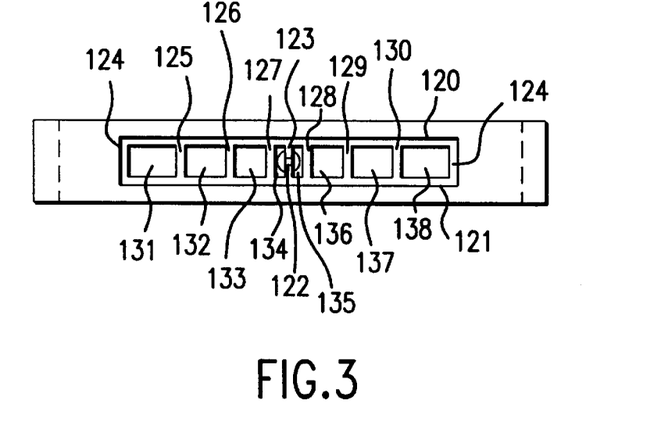
FIG. 3 shows in bottom view the rider ring of FIG. 2.
Figure 4:
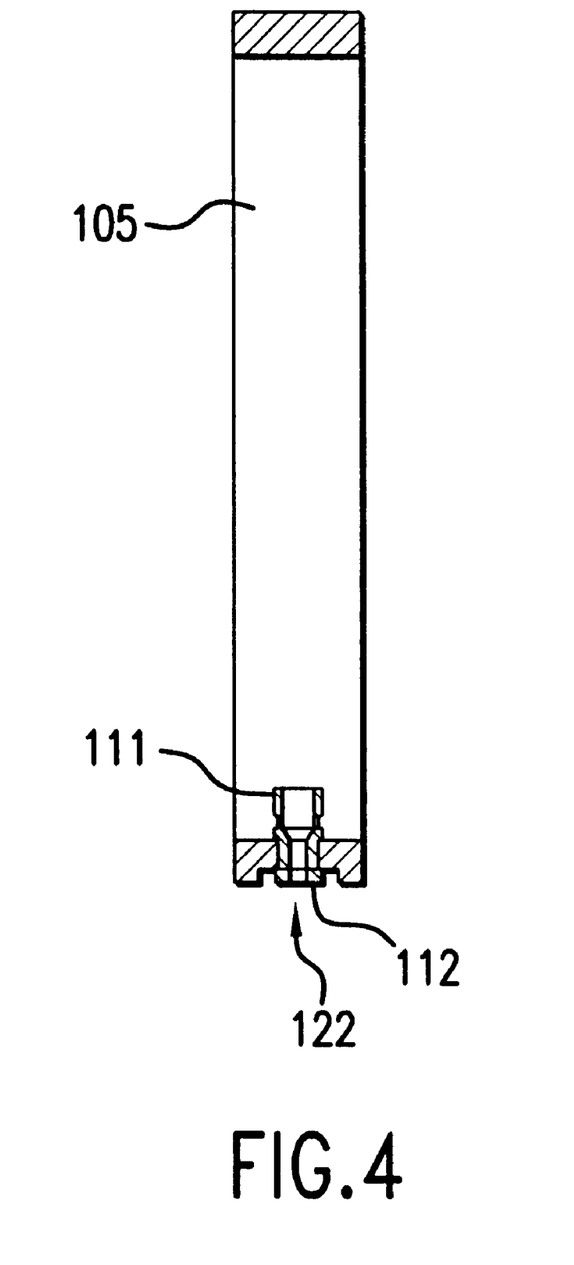
FIG. 4 shows a section along the line V—V in FIG. 2.

Around the piston 74, near each end face thereof, a rider ring, which will be explained in further detail with reference to FIGS. 2, 3 and 4, is fitted in a peripheral groove in the body of the piston 74. These essentially identical rider rings 105 and 106 project over a short distance beyond the body of the piston 74. An assembly of piston rings 109 also lies around the body of the piston 74, at a point between the rider rings 105 and 106, in order to prevent gas from flowing from the high-pressure side of the cylinder 73 to the low-pressure side.

As can be seen in FIG. 1, the chamber 100 of the piston 74 is in communication with one or more outflow openings 107, 108 formed in each rider ring. The source, which is formed by the chamber 100 combined with the part of the compressor which supplies gas under pressure to said chamber 100, should be designed in such a way that during the operation of the compressor gas under pressure constantly flows out of the chamber 100 to the outflow openings 107 and 108. This means that the pressure in the chamber 100 in every case should be higher than the maximum delivery pressure of the gas in the compression chambers 81 and 82.

The gas forms a gas film between the rider rings 105, 106 and the smooth wall of the cylinder 73. The bearing capacity of such a gas film is determined by the pressure of the gas in the film and the surface over which said pressure acts upon the part of the piston/piston rod unit to be supported. This surface will be a section of the bottom half of the rider ring here in each case.

In a variant of the piston compressor according to FIG. 1 which is not shown valve means are provided in the piston 74, which ensure that at a certain gas pressure in the compression chamber 81, 82, in which gas sucked in is compressed, the communication between the chamber 100 and the outflow opening 107 or 108 belonging to said compression chamber is shut off, and a gas film is only formed between the piston 74 and the cylinder 73 at the low-pressure side of the piston rings 109. This means that the gas pressure in the chamber 100 can be lower than in the case of the piston compressor shown in FIG. 1, which is simple to achieve. Through producing an overlap between the formation of the gas film at one side of the piston rings 109 and the fall-off of the gas film at the other side thereof, it is ensured that a gas film is constantly present between the piston and the cylinder.

In another variant which is not shown the rider rings are not accommodated in a groove in the body of the piston, but the body of the piston is constructed of several separate segments, and a rider ring is clamped between two segments.

An exemplary embodiment of the rider rings 105 and 106 will now be explained with reference to the rider ring 105 shown in FIGS. 2, 3 and 4. The rider ring 105 is an annular element with an accurate cylindrical inside diameter, which is adapted to the peripheral groove to be formed in the body of the piston, in which groove the ring is placed. However, the outer periphery of the rider ring 105 is not exactly cylindrical. As can be seen in FIG. 2, the bottom segment of the outer periphery when the rider ring is fitted has a slightly larger radius than the top segment connecting thereto. The bottom segment extends through an angle on either side of the vertical 110, and the radius virtually corresponds to the radius of the cylinder along which the rider ring moves. The reasons for this design of the outer periphery is that for forming the gas film between the belt 105 and the cylinder 73 it must be possible to move the piston 74 upwards a slight distance and sufficient play should remain for mechanical and thermal deformation.

It can be seen from the section of FIG. 4 that a nipple 111 is screwed into the rider ring, with a bore which opens out in a circular end face 112. The end face 112 lies recessed relative to the outer periphery of the rider ring 105. For the setting of the gas film it is important that the outflow opening 122 in the nipple 111 is in the form of a restriction for the gas flow. The outflow opening 122 is in communication with the chamber 100 by way of a bore 113 in the wall of the piston 74 (see FIG. 1).

As already mentioned earlier, the supporting capacity of this gas bearing system is determined, inter alia, by the effective surface over which the gas film supports the piston/piston rod unit. In order to obtain a large surface with a stable gas film, a pattern of grooves is provided in the bottom segment of the rider ring 105, which can be seen in particular from FIG. 3. The pattern of grooves comprises two parallel main grooves 120, 121, which lie on either side of the nipple 111. It can be seen from FIG. 2 that each of the main grooves 120, 121 extends through an angle symmetrically towards either side, along outflow opening 122 of the nipple 111 situated on the vertical 110. A central transverse groove 123 connects the two main grooves 120, 121 to the outflow opening 122. At their ends the main grooves 120, 121 are connected by transverse grooves 124. Transverse grooves 125–130, lying symmetrically relative to the vertical 110, connect the two main grooves 120, 121 and in this way form fields 131–138. The fields 131–138 lie flush with the remaining part of the bottom segment of the rider ring 105.

The pattern of grooves described above shows only one possible solution. In certain situations it will even be possible to dispense entirely with the pattern of grooves and provide just one or more outflow openings in the form of a simple bore.

It is preferable to make the rider rings 105 and 106 from a material which has advantageous emergency running properties, so that if the gas film accidentally falls off no undesirable wear of the cylinder wall will occur. For that reason, a material like PTFE or white metal is preferred. Through this choice of the material of the rider rings, allowance is made for the situation where the gas film in the bearing means according to the invention need not be complete and/or will not be complete in practice, in other words, direct friction contact can still occur between parts of the piston, in the case of FIG. 1 the rider rings 105, 106 and the cylinder.

In FIG. 1 the source for the gas which is supplied under pressure to the corresponding gas bearings of the piston/piston rod unit which are externally pressurised is indicated only diagrammatically, in order to indicate that many solutions are suitable. In principle, the main condition which such a source must meet is that gas should flow constantly out of one or more of the outflow openings, in order to maintain a gas film between the cylinder and the piston. The outflow of the gas from an outflow opening will in this case depend, inter alia, on the pressure in the region to which the gas flows. That is why it is particularly important in the case of the exemplary embodiment described with reference to FIG. 1 that the source can supply gas at a pressure which is higher than the maximum delivery pressure of the gas in a compression chamber of the compressor. For example, it is possible for the source to be formed by a higher pressure stage of the same compressor or of another compressor. Moreover, in particular in the situation where the gas of the gas film enters into the cylinder, it is preferable for the gas supplied to the gas bearings provided externally with pressure to be the same as the gas to be compressed by the compressor.

Figure 5:
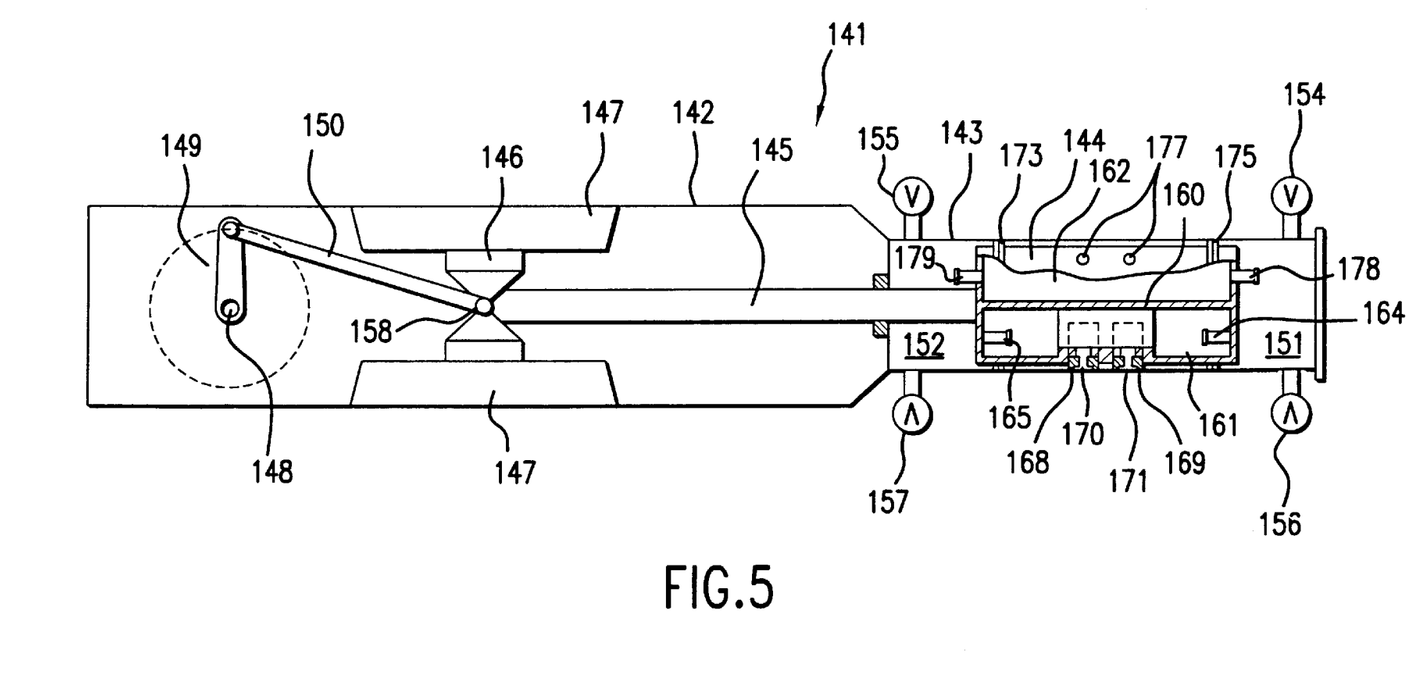
FIG. 5 shows diagrammatically a vertical section of a second exemplary embodiment of the horizontal piston compressor according to the invention.

The horizontal piston compressor 141 shown in FIG. 5 comprises a frame 142, in which a cylinder 143 is accommodated. The cylinder 143 contains a piston 144, which is movable to and fro in the cylinder 143. In FIG. 5 the bottom part of the piston 144 is shown in longitudinal section, and the top part is shown in elevation. A piston rod 145 is fixed at its right end in FIG. 5 to the piston 144, and at its left end in FIG. 5 is coupled to crosshead 146. The crosshead 146 is guided by means of guides 147 in such a way that it is movable reciprocably in a horizontal straight line in the frame 142 of the compressor.

The movement of the crosshead 146 is produced by means of a crank mechanism, such as is generally known in the case of horizontal piston compressors. The rotary movement of drive shaft 148 is transmitted to the crosshead 146 by way of the crank 149 fixed thereto and connecting rod 150, which is fitted between the crank 149 and the crosshead 146.

The compressor shown in FIG. 5 is of the double-acting type. Compression chambers 151 and 152 are formed in the cylinder 143 by the piston 144. The compression chamber 151 is provided with an inlet valve 154 and an outlet valve 156, the compression chamber 152 is provided with inlet valve 155 and outlet valve 157. On movement of the piston 144 in the direction of the crank mechanism, to the left in FIG. 5, gas at a suction pressure is sucked by way of the inlet valve 154 into the compression chamber 151. After reversal of the direction of movement of the piston 144 the gas in the compression chamber 151 is compressed and discharged at a discharge pressure by way of the outlet valve 156.

As the name horizontal piston compressor already indicates, the frame 142 of the compressor is placed on a bedplate in such a way that the cylinder 143 is situated in a horizontal position. According to the present invention, measures are proposed for the bearing support of the piston/ piston rod unit, formed by the piston 144 and the piston rod 145. At the left end in FIG. 5 said unit rests by way of the crosshead 146 on the frame 142, lubricating oil generally being introduced between the guides 147 and the crosshead 146. However, this support at the crosshead 146 is unable to prevent the piston 144 from dragging along the bottom part of the wall of the cylinder 143, in particular because there will be a certain play between crosshead 146 and guides 147, which permits tilting of the crosshead 146, and because the slim piston rod 145 will bend. The other bearing means which support the piston/piston rod unit are described below.

The piston 144 is provided with a cavity, and a partition 160 divides said cavity into two chambers 161 and 162. The chamber 161 is in communication by way of delivery valves 164 and 165 with the compression chambers 151 and 152. The valves 164 and 165 are designed in such a way that they open when the pressure is sufficiently high in the corresponding compression chamber. Around part of the bottom half of the periphery of the piston 144 lie one or more—in this case two—segment-shaped annular elements 168, 169 (indicated by dashed lines), which are each provided with one or more outflow openings 170, 171. Said outflow openings 170, 171 are in communication with the chamber 161, for example in the manner described with reference to FIGS. 1–4.

The gas coming out of the chamber 161 at the outflow openings 170, 171 forms a very thin gas film between the corresponding annular element and the wall of the cylinder. Through the presence of an assembly of piston rings 173, 175 on either side of the two annular elements 168, 169, it is ensured that the pressure in the region of the gas films between the annular elements 168, 169 and the cylinder wall is always lower than the delivery pressure in the compression chambers 151 and 152. Due to the fact that the chamber 161 is in each case supplied with gas at a pressure which lies close to the delivery pressure in the compression chambers 151 and 152, a constant supply of gas to the gas film is ensured.

The gas supplied into the space between the two assemblies of piston rings 173, 175 must, of course, also be discharged again. This is achieved through openings 177 in the wall of the piston 144, which connects the space between the piston rings 173, 175 to the chamber 162. Said chamber 162 is in turn in communication with the compression chambers 151 and 152 by way of suction valves 178, 179. If the pressure in the compression chamber in question is sufficiently low, the suction valve 178 or 179 in question will open, and gas will be discharged from the chamber 162. If the volume of the chambers 161 and 162 is made sufficiently great, the changes in the pressure in the chambers 161, 162 are limited, and the gas flow which is necessary for maintaining a stable gas film between the annular elements 168, 169 and the cylinder wall 143 can be obtained.

The piston 144, as described above and shown in FIG. 5, can be used very advantageously for the conversion of existing piston compressors of the "oil-lubricated" type to "oil-free" compressors. For the piston 144 has all the elements which are necessary for forming a stable gas bearing system, so that essentially only the piston of the existing compressor need be replaced by the piston 144.

Figure 6:
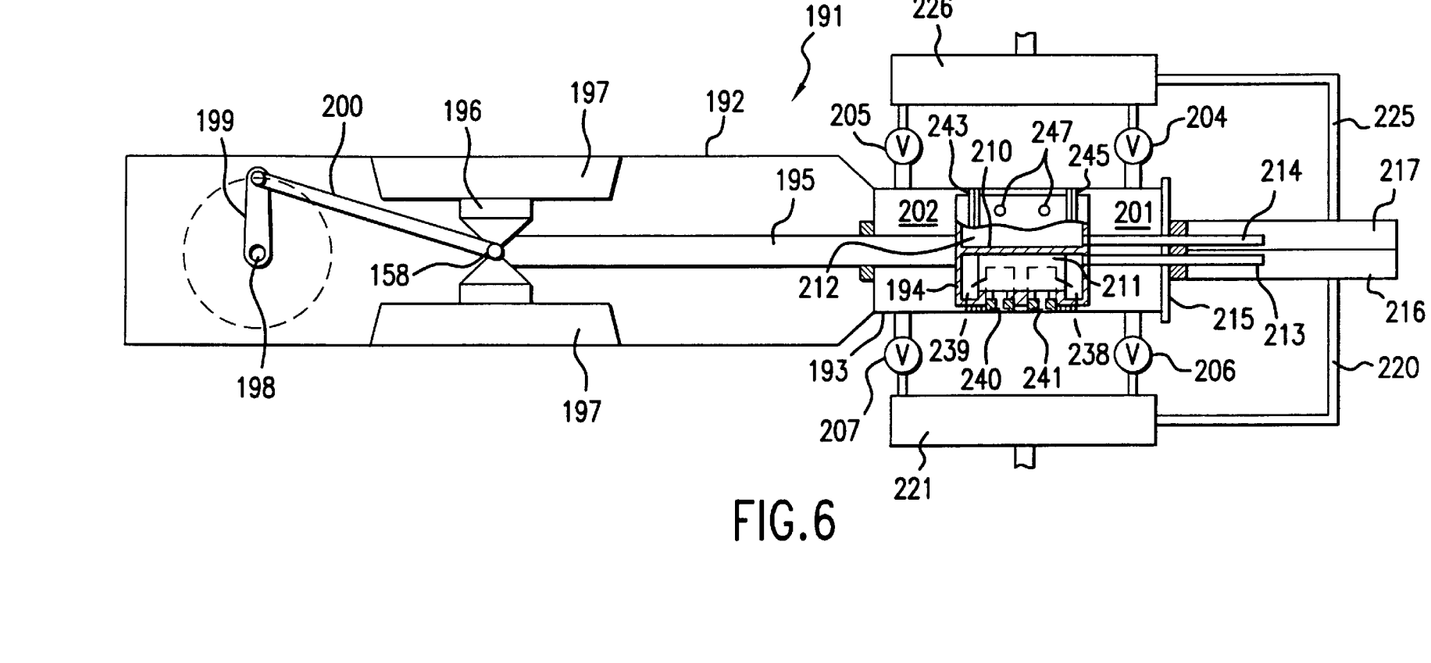
FIG. 6 shows diagrammatically a vertical section of a third exemplary embodiment of the horizontal piston compressor according to the invention.

The horizontal piston compressor 191 shown in FIG. 6 comprises a frame 192 which accommodates a cylinder 193. The cylinder 193 contains a piston 194, which is reciprocable in the cylinder 193. In FIG. 6 the bottom part of the piston 194 is shown in section and the upper part in elevation. A piston rod 195 is fixed to the piston 194 at its right end in FIG. 6, and at its left end in FIG. 6 is connected to crosshead 196. The crosshead 196 is guided reciprocably in a horizontal straight line in the frame 192 of the compressor by means of guides 197.

The movement of the crosshead 196 is produced by means of a crank mechanism, such as is generally known in the case of horizontal piston compressors. The rotary movement of drive shaft 198 is transmitted to the crosshead 196 by way of the crank 199 fixed thereto and connecting rod 200, which is fitted between the crank 199 and the crosshead 196.

The compressor shown in FIG. 6 is of the double-acting type. Compression chambers 201 and 202 are formed in the cylinder 193 by the piston 194. The compression chamber 201 is provided with an inlet valve 204 and an outlet valve 206, while the compression chamber 202 is provided with inlet valve 205 and outlet valve 207. On movement of the piston 194 in the direction of the crank mechanism, to the left in FIG. 6, gas at a suction pressure is sucked by way of the inlet valve 204 into the compression chamber 201. After the reversal of the direction of movement of the piston 294, the gas in the compression chamber 201 is compressed and discharged at a delivery pressure through the outlet valve 206.

As the name horizontal piston compressor already indicates, the frame 192 of the compressor is placed on a bedplate in such a way that the cylinder 193 is situated in a horizontal position. According to the present invention, measures are proposed for the bearing support of the piston/ piston rod unit, formed by the piston 194 and the piston rod 195. At the left end in FIG. 6 said unit rests by way of the crosshead 196 on the frame 192, lubricating oil generally being introduced between the guides 197 and the crosshead 196.

The piston 194 has a cavity, and a partition 210 divides the cavity into two chambers 211 and 212. Two hollow rods 213 and 214 are fitted on the piston 194. Cylinder cover 215 is designed in such a way that two chambers 216 and 217 are formed, and the rods 213 and 214 project, sealed by a corresponding stuffing box, into the chambers 216 and 217 respectively. The chamber 216 is connected by way of a conduit 220 to a pressure chamber 221, which in turn is connected to the two delivery valves 206, 207 of the cylinder 193. The chamber 217 is connected by way of conduit 225 to a suction chamber 226, which in turn is connected to the suction valves 204, 205 of the cylinder 193. This arrangement ensures that a gas under pressure is supplied constantly into the chamber 211, while gas is discharged from the chamber 212.

Around part of the bottom half of the periphery of the piston 194 lie one or more—in this case two—segment-shaped annular elements 238, 239 (indicated by dashed lines), which are each provided with one or more outflow openings 240, 241. Said outflow openings 240, 241 are in communication with the chamber 211, for example in the manner described with reference to FIGS. 2–4.

The gas coming out of the chamber 211 at the outflow openings 240, 241 forms a film between the corresponding annular element and the wall of the cylinder. Through the presence of an assembly of piston rings 243, 245 on either side of the two annular elements 238, 239, it is ensured that the pressure in the region of the gas film between the annular elements 238, 239 and the cylinder wall is always lower than the delivery pressure in the compression chambers 201 and 202. Due to the fact that the chamber 211 is in each case supplied with gas at a pressure which lies close to the delivery pressure in the compression chambers 201 and 202, a constant supply of gas to the gas film is ensured.

The gas supplied into the space between the two assemblies of piston rings 243, 245 is discharged through openings 247 in the wall of the piston 194, which connect the space between the piston rings 243, 245 to the chamber 212.

Figure 7:
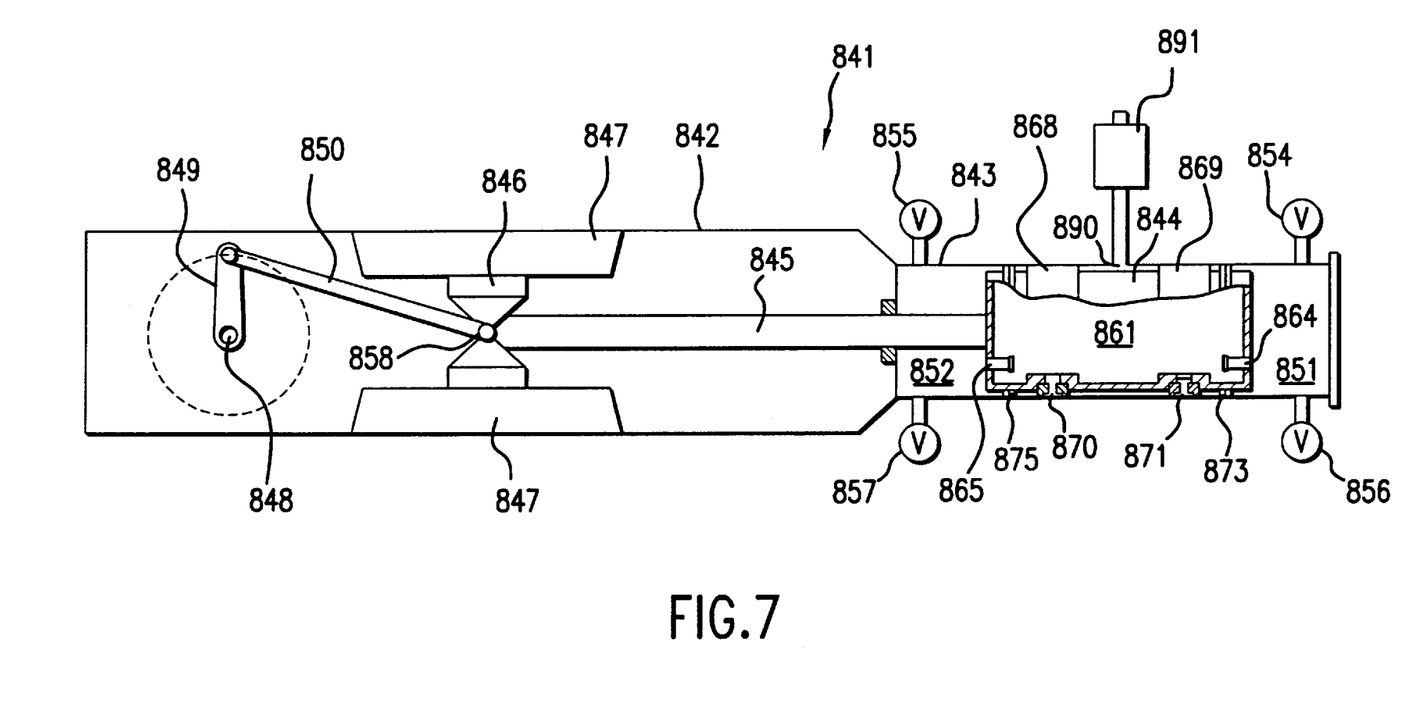
FIG. 7 shows diagrammatically a vertical section of a fourth exemplary embodiment of the horizontal piston compressor according to the invention.

The horizontal piston compressor 841 shown in FIG. 7 comprises a frame 842 which accommodates a cylinder 843. The cylinder 843 contains a piston 844, which is reciprocable in the cylinder 843. In FIG. 7 the bottom part of the piston 844 is shown in section and the upper part in elevation. A piston rod 845 is fixed to the piston 844 at its right end in FIG. 7, and at its left end in FIG. 8 is connected to crosshead 846. The crosshead 846 is guided reciprocably in a horizontal straight line in the frame 842 of the compressor by means of guides 847.

The movement of the crosshead 846 is produced by means of a crank mechanism, such as is generally known in the case of horizontal piston compressors. The rotary movement of drive shaft 848 is transmitted to the crosshead 846 by way of the crank 849 fixed thereto and connecting rod 850, which is fitted between the crank 849 and the crosshead 846.

The compressor shown in FIG. 7 is of the double-acting type. Compression chambers 851 and 852 are formed in the cylinder 843 by the piston 844. The compression chamber 851 is provided with an inlet valve 854 and an outlet valve 856, while the compression chamber 852 is provided with inlet valve 855 and outlet valve 857. On movement of the piston 844 in the direction of the crank mechanism, to the left in FIG. 7, gas at a suction pressure is sucked by way of the inlet valve 854 into the compression chamber 851. After the reversal of the direction of movement of the piston 844, the gas in the compression chamber 851 is compressed and discharged at a delivery pressure through the outlet valve 856.

As the name horizontal piston compressor already indicates, the frame 842 of the compressor is placed on a bedplate in such a way that the cylinder 843 is situated in a horizontal position.

According to the present invention, measures are proposed for the bearing support of the piston/piston rod unit, formed by the piston 844 and the piston rod 845. At the left end in FIG. 7 said unit rests by way of the crosshead 846 on the frame 842, lubricating oil generally being introduced between the guides 847 and the crosshead 846. However, this support at the crosshead 846 is unable to prevent the piston 844 from dragging along the bottom part of the wall of the cylinder 843, in particular because there will be a certain play between crosshead 846 and guides 847, which permits tilting of the crosshead 846, and because the slim piston rod 845 will bend. The other bearing means which support the piston/piston rod unit are described below.

The piston 844 has a chamber 861. The chamber 861 is in communication by way of delivery valves 864 and 865 with the compression chambers 851 and 852 respectively. The valves 864 and 865 are designed in such a way that they open when the pressure is sufficiently high in the corresponding compression chamber. Around part of the bottom half of the periphery of the piston 844 lie one or more—in this case two—annular elements 868, 869, which are each provided with one or more outflow openings 870, 871. Said outflow openings 870, 871 are in communication with the chamber 861, for example in the manner described with reference to FIGS. 2–4.

The gas coming out of the chamber 861 at the outflow openings 870, 871 forms a very thin gas film between the corresponding annular element and the wall of the cylinder. Through the presence of an assembly of piston rings 873, 875 on either side of the two annular elements 868, 869, it is ensured that the pressure in the region of the gas films between the annular elements 868, 869 and the cylinder wall is independent of the delivery pressure in the compression chambers 851 and 852. Due to the fact that the chamber 861 is in each case supplied with gas at a suitable pressure, a continuous supply of gas to the gas film can be ensured.

The gas supplied into the space between the two assemblies of piston rings 873, 875 must also be discharged again. This is achieved by gas discharge means, which in this case are in the form of one or more outflow openings 890 in the wall of the cylinder 843. Said outflow opening 890 lies in such a position that it is in communication with the space which is bounded by the piston 844, the cylinder 843 and the piston rings 873, 875. Connected to the outflow opening 890 is a control device 891, which is designed to control the outflow of gas through the outflow opening 890. With this device 891, which can be, for example, a simple throttle valve, the gas pressure in this space can be set and a very stable gas film can be obtained.

With the measures according to the invention described with reference to FIG. 7 it is simple to convert an existing piston compressor of the oil-lubricated type to an "oil-free" compressor, or to provide an "oil-free" compressor with a gas bearing system. For this, essentially only the piston need be replaced by a piston of the type in FIG. 7, while for the provision of the outflow opening for the gas forming a gas film use can be made of the lubricating oil supply opening generally already present in the cylinder.

It will be clear that the solutions described above for the bearing support of the piston/piston rod unit relative to the stationary part of the compressor can also be used in the case of single-acting or tandem compressors.

What is claimed is:

1. Piston compressor for compressing gas, comprising a frame with at least one cylinder which has an essentially horizontal axis, a piston having a piston body, the piston being reciprocable in the cylinder, which piston in the cylinder bounds at least one compression chamber in which the gas is compressed, a piston rod which at one end thereof is fixed to the piston, while the other end thereof is coupled to a crosshead which is guided in the frame and reciprocable by a drive mechanism, and bearing means which support a piston/piston rod unit, formed by the piston and the piston rod connected thereto, relative to the frame, the bearing means comprising at least one annular element fitted around at least the bottom of the piston body and projecting beyond the periphery of the piston body, the annular element being made of a material suitable for direct frictional contact with the cylinder, wherein the bearing means further comprise:

a source which continuously delivers a gas under pressure, conduit means which are connected to the source and open out at at least one outflow opening provided in the annular element for supplying the gas coming from the source to a position between the annular element and the cylinder, the position of the at least one outflow opening and the pressure of the gas supplied from the source being such that gas supplied to a position between the annular element and the cylinder constantly exerts an upward force on the piston/piston rod unit.

2. Piston compressor according to claim 1, wherein the piston body is provided with at least one peripheral groove, and wherein the peripheral groove contains an annular element which comprises the at least one outflow opening for the gas coming from the source.

3. Piston compressor according to claim 1, wherein the bearing means comprise a belt lying around the periphery of the piston body and provided with an outflow opening for the gas, the belt in a top segment thereof, which comprises at least the top half of the belt, being designed with a smaller outer peripheral radius than in the bottom segment.

4. Piston compressor according to claim 1, wherein each outflow opening for the gas coming from the source comprises a mouth which is in communication with the conduit means, and a pattern of grooves connecting to the mouth, which pattern is formed in the annular element and extends over a peripheral sector of the annular element.

5. Piston compressor according to claim 1, wherein the space present between the piston and the cylinder, in which the at least one outflow opening opens out, is in communication with a compression chamber of the compressor, and wherein the source for the supply of gas to the at least one outflow opening is adapted for supplying the gas at a pressure which is higher than the pressure in the compression chamber.

6. Piston compressor according to claim 1, wherein the space present between the piston and the cylinder, in which the at least one outflow opening opens out, is in communication with a compression chamber of the compressor, and wherein the source for the supply of gas to the at least one outflow opening is adapted for supplying the gas at a pressure which is higher than the pressure in the compression chamber, and wherein near each of the end faces thereof the piston is provided with at least one outflow opening which opens out near the underside, for the gas coming from the source, and wherein a gas seal is present between the outflow opening situated at one end face and the outflow opening situated at the other end face, which gas seal is effective between the piston and the cylinder.

7. Piston compressor according to claim 1, wherein gas sealing means which are effective between the piston and the cylinder are provided, which gas sealing means together with the piston and the cylinder bound a space separated from each compression chamber of the compressor, in which space the at least one outflow opening opens out, and wherein gas discharge means are provided for discharging the gas from the space.

8. Piston compressor according to claim 1, wherein gas sealing means which are effective between the piston and the cylinder are provided, which gas sealing means are piston rings provided around the piston body, which piston rings together with the piston and the cylinder bound a space separated from each compression chamber of the compressor, in which space the at least one outflow opening opens out, and wherein gas discharge means are provided for discharging the gas from the space.

9. Piston compressor according to claim 1, wherein gas sealing means which are effective between the piston and the cylinder are provided, which gas sealing means together with the piston and the cylinder bound a space separated from each compression chamber of the compressor, in which space the at least one outflow opening opens out, and wherein gas discharge means are provided for discharging the gas from the space, and wherein the bearing means also comprise gas pressure control means for controlling the pressure of the gas in the space.

10. Piston compressor according to claim 1, wherein gas sealing means which are effective between the piston and the cylinder are provided, which gas sealing means together with the piston and the cylinder bound a space separated from each compression chamber of the compressor, in which space the at least one outflow opening opens out, and wherein gas discharge means are provided for discharging the gas from the space, and wherein the piston comprises a high-pressure chamber and a low-pressure chamber, the high-pressure chamber being in communication with the at least one outflow opening and with means for supplying gas under pressure to the high-pressure chamber, and the low-pressure chamber being in communication with the space formed by the gas sealing means, the piston and the cylinder and with gas discharge means for discharging gas from the low-pressure chamber.

11. Piston compressor according to claim 1, wherein gas sealing means which are effective between the piston and the cylinder are provided, which gas sealing means together with the piston and the cylinder bound a space separated from each compression chamber of the compressor, in which space the at least one outflow opening opens out, and wherein gas discharge means are provided for discharging the gas from the space, and wherein the piston comprises a high-pressure chamber and a low-pressure chamber, the high-pressure chamber being in communication with the at least one outflow opening and with means for supplying gas under pressure to the high-pressure chamber, and the low-pressure chamber being in communication with the space formed by the gas sealing means, the piston and the cylinder and with gas discharge means for discharging gas from the low-pressure chamber, and wherein the piston comprises a delivery valve which can connect the high-pressure chamber to a compression chamber of the compressor, and wherein the piston comprises a suction valve which can connect the low-pressure chamber to a compression chamber of the compressor.

12. Piston compressor according to claim 1, wherein gas sealing means which are effective between the piston and the cylinder are provided, which gas sealing means together with the piston and the cylinder bound a space separated from each compression chamber of the compressor, in which space the at least one outflow opening opens out, and wherein gas discharge means are provided for discharging the gas from the space, and wherein the piston comprises a high-pressure chamber and a low-pressure chamber, the high-pressure chamber being in communication with the at least one outflow opening and with means for supplying gas under pressure to the high-pressure chamber, and the low-pressure chamber being in communication with the space formed by the gas sealing means, the piston and the cylinder and with gas discharge means for discharging gas from the low-pressure chamber, and wherein the compressor comprises conduit means which connect the high-pressure chamber to the delivery side of the compressor, and conduit means which connect the low-pressure chamber to the suction side of the compressor.

13. Piston compressor according to claim 1, wherein gas sealing means which are effective between the piston and the cylinder are provided, which gas sealing means together with the piston and the cylinder bound a space separated from each compression chamber of the compressor, in which space the at least one outflow opening opens out, and wherein gas discharge means are provided for discharging the gas from the space, said gas discharge means comprising at least one outflow opening which is disposed in the cylinder and connects to the space which is bounded by the cylinder, the piston and the gas sealing means which are effective between the cylinder and the piston, so that the gas can be discharged from said space by way of this at least one outflow opening.

14. Piston compressor according to claim 1, wherein gas sealing means which are effective between the piston and the cylinder are provided, which gas sealing means together with the piston and the cylinder bound a space separated from each compression chamber of the compressor, in which space the at least one outflow opening opens out, and wherein gas discharge means are provided for discharging the gas from the space, said gas discharge means comprising at least one outflow opening which is disposed in the cylinder and connects to the space which is bounded by the cylinder, the piston and the gas sealing means which are effective between the cylinder and the piston, so that the gas can be discharged from said space by way of this at least one outflow opening, and wherein a gas control device connects to the at least one outflow opening for the gas, for regulation of the gas pressure in the space.

15. Piston compressor according to claim 1, wherein the gas delivered by the source corresponds to the gas to be treated by the compressor.

16. Piston compressor according to claim 1, wherein the piston is a two-stage piston, and wherein the conduit means are formed in the piston and connect to the second stage of the compressor, which forms the source for the gas under pressure.

17. Piston in combination with a piston compressor according to claim 1, the piston comprising a piston body, wherein one or more annular elements are fitted around at least the bottom half of the periphery of the piston body and project beyond the piston body, each annular element being provided with an outflow opening for the gas coming from the source, which gas forms a film between the annular element and the cylinder of the piston compressor.

* * * * *